3,362,947
ACYLATED PEPTIDES CONTAINING UP TO FOUR AMINO ACID RESIDUES, AT LEAST ONE OF WHICH IS A BASIC AMINO ACID
Peter Quitt, Basel, and Karl Vogler, Riehen, Switzerland, assignors to Hoffmann-La Roche Inc., Nutley, N.J., a corporation of New Jersey
No Drawing. Filed Oct. 7, 1963, Ser. No. 314,489
Claims priority, application Switzerland, Oct. 12, 1962, 12,007/62
11 Claims. (Cl. 260—112.5)

This invention relates to novel peptide compounds, their use as intermediates and their manufacture. More particularly, the novel peptide compounds of the invention are selected from the group consisting of compounds of the formula

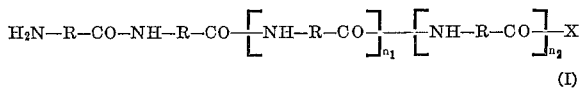

(I)

and acid addition salts thereof wherein $n_1$ and $n_2$ are each a whole integer from 0 to 1; X is selected from the group consisting of hydroxy, alkoxy, amino, alkylamino, dialkylamino and hydrazino; each R is the residue of an α-amino acid devoid of its α-amino and carboxyl groups, at least one R being the residue of a diamino-carboxylic acid; and the molecule contains at least one long-chain aliphatic group consisting of a long-chain aliphatic substituent selected from the group consisting of alkoxycarbonyl and alkenoxycarbonyl on an amino group not partaking in a peptide linkage.

The compounds of Formula I above are dipeptides, tripeptides or tetrapeptides derived from α-amino carboxylic acids such as serine, phenylalanine, tyrosine, leucine, lysine, arginine, ornithine, α,γ-diaminobutyric acid and α,β-diaminopropionic acid, and the like, linked in α-amide fashion. Especially preferred as building component α-amino-carboxylic are diamino-carboxylic acids such as lysine and the basic acids named thereafter in the foregoing exemplary listing. Thus, where R in Formula I above is the residue of a diamino-carboxylic acid, it can be represented by the formula:

wherein $R_1$ is selected from the group consisting of lower alkylene (preferably methylene, dimethylene, trimethylene, or tetramethylene) and

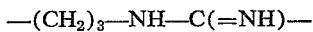

When $R_1$ is the latter group, R of course is the residue of arginine. Also preferred are building components derived from essential amino acids. Moreover, there are preferred α-amino acid components of optically active amino acids; the preferred optical form being the L-form.

Compounds of Formula I are especially preferred wherein $n_1$ and $n_2$ are each 0, that is the dipeptide compounds are preferred. One preferred group of compounds of Formula I above are those wherein X is lower alkoxy such as methoxy, ethoxy or the like. The long-chain alkoxycarbonyl or alkenoxycarbonyl group is preferably derived from an alcohol containing at least 8 carbon atoms. Preferred are alkoxy and alkenoxy groups derived from alcohols containing at least 8 and no more than 20 carbon atoms. The long-chain moiety can be either saturated or unsaturated. Comprehended are both poly-unsaturated and mono-unsaturated moieties. In one aspect, the long-chain alkoxycarbonyl or alkenoxycarbonyl moiety is preferably derived from a long chain, unbranched saturated alcohol such as lauryl, cetyl or myristyl alcohol.

In Formula I above the consecutive R-symbols can be derived from similar as well as different α-amino-carboxylic acids.

The compounds of Formula I and acid addition salts thereof can be prepared in accord with processes which are known per se in peptide chemistry. Thus, for example, they can be built up from the appropriate α-amino-carboxylic acids or appropriate protected peptides with the use of condensing agents, or via mixed anhydrides, azides, activated esters, or acid chlorides, the terminal carboxyl function of which can, if desired, be hydrolyzed to the free carboxyl group or can be converted into an amido, N-alkylamido, N,N-dialkylamido or hydrazido group. The protecting groups can be removed and the resulting peptide compounds, if desired, converted into their salts and a long-chain alkoxycarbonyl and/or alkenoxycarbonyl group introduced by interchange with a protecting group which can be selectively split off.

According to one preferred aspect, a compound of the formula

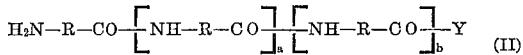

(II)

can be reacted with a compound of the formula

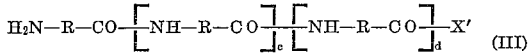

(III)

wherein a, b, c and d are each a whole integer from 0 to 1 and the total of a, b, c and d is a whole integer from 0 to 2; Y is selected from the group consisting of halogen, hydroxy, azido, phenoxy, nitrophenoxy, phenylmercapto and the residue of an anhydride with an inorganic or organic acid; X' is selected from the group consisting of alkoxy, amino, alkylamino, dialkylamino, and hydroxy in the form of a salt with an inorganic (e.g., alkali metal or alkaline earth metal) or tertiary organic ((e.g., tri(lower alkyl)amine))base, and each R has the same meaning as in Formula I above, at least one R residue containing an amino group and all amino groups with the exception of the one terminating the chain of Formula III being protected by removable protecting groups and/or long-chain alkoxycarbonyl or alkenoxycarbonyl groups.

The reaction between the compounds of Formulae II and III above comprises a condensation together with a splitting off of the compound H—Y so as to form a dipeptide, tripeptide, or tetrapeptide of the formula:

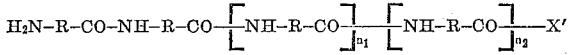

wherein $n_1$, $n_2$, each R and X' have the same meaning as above, and in which all amino groups are protected in the same manner indicated with respect to Formulae II and III above.

Those peptides of Formula IV which neither contain a long-chain N-alkoxycarbonyl or N-alkenoxycarbonyl substituent are then converted into corresponding peptides substituted by long-chain N-alkoxycarbonyl or N-alkenoxycarbonyl groups by interchange of at least one selectively removable protecting group for a long-chain N-alkoxycarbonyl or N-alkenoxycarbonyl group. The product obtained can, if desired, be converted into its hydrazide, the removable protecting groups can be split off, and the so-obtained N-alkoxycarbonyl or N-alkenoxycarbonyl substituted peptide products can be converted into their acid addition salts.

In one aspect a long-chain alkoxycarbonyl or alkenoxycarbonyl group can be introduced on an α-amino group by allowing an appropriately saturated α-isocyano-carboxylic acid ester (prepared by known methods) to react with a long-chain alcohol. The resulting saturated amino acid derivative can be converted into di-, tri- or tetrapeptides of Formula I in accordance with methods known per se in peptide chemistry.

As usual in peptide chemistry, the reactive groups which do not take part in the formation of the peptide are protected prior to the condensation reaction involving the spliting off of HY. Such protection is readily accomplished in the case of the carboxyl group by conversion to a corresponding ester or amide or by salt formation with an inorganic base or an organic tertiary base. Free amino groups can, for example, be protected by conversion into benzyloxycarbonylamino groups, (i.e., their corresponding carbobenzoxy groups) for example, by the action of benzyloxycarbonyl chloride in a Schotten-Baumann reaction. The carbobenzoxy protecting groups can subsequently be split off by catalytic hydrogenation. With regard to the condensation wherein the peptide bonds are formed, the long-chain N-alkoxycarbonyl and N-alkenoxycarbonyl groups can themselves serve as protecting groups. The amino groups of the intermediate amino acids or peptides can also be protected via their conversion into phthalyl derivatives, for example, by heating the amino acid or peptide with phthalic acid anhydride. In this embodiment, the phthalyl protecting groups can be removed from the protected amino group after the condensation via the addition of hydrazine to form a hydrazide derivative and treatment with hydrochloric acid. The amino groups can also be protected by formylation by reacting the intermediate amino acids or peptides with formic acid in the presence of acetic anhydride.

By having one or more of the amino groups protected by a formyl protecting group and one or more amino groups protected by a carbobenzoxy group, it is possible to selectively remove either the carbobenzoxy groups or the formyl groups, since only the carbobenzoxy groups are removable by catalytic hydrogenation or by the action of a hydrobromic acid/acetic acid mixture while only the formyl groups are removed by the action of mineral acids in the cold. It is thus possible to introduce the long-chain N-alkoxycarbonyl or N-alkenoxycarbonyl substituent immediately after the condensation. Such introduction can, for example, be effected via the action of an appropriate long-chain alkoxycarbonyl halide or alkenoxycarbonyl halide such as, for example, a chloride such as myristyloxycarbonyl chloride.

The following synopses are illustrative of the methods available for preparing the compounds of this invention:

Carbodiimide method

This method comprehends a compound of Formula II above in which Y is hydroxy, i.e., an amino acid, dipeptide or tripeptide bearing a terminal free carboxylic group. The method comprises effecting the condensation of a starting material of Formula II wherein Y is hydroxy with the starting material of Formula III in the presence of a condensing agent, such as a carbodiimide, e.g., dicyclohexylcarbodiimide, carbonyldiimidazole, or the like. The condensation is carried out in a solvent at low temperature. Suitable solvents are organic solvents such as chloroform, N,N-dimethylformamide, ethyl acetate, or the like. The urea formed from the condensation agent can be removed by filtration, and the peptide product which remains in solution can be isolated from the filtrate.

Azide method

This method comprehends formation of the peptide by the interaction of an acid azide ($Y=N_3$) and an amino group. The acid azide can be obtained by action of nitrous acid on the corresponding hydrazide. The reaction can suitably be conducted at low temperatures in a solvent such as ethyl acetate, N,N-dimethylformamide, and, if desired, in the presence of acetic acid.

Acid chloride method

This method comprehends formation of the peptide by reaction of an acid chloride group ($Y=Cl$) with an amino group. One can conveniently couple a carbobenzoxy amino acid chloride (obtained via the action of thionyl chloride) with an amino acid ester ($X^1$=alkoxy) in the cold in the presence of a base.

Method utilizing mixed anhydrides

This method comprehends using for the condensation a compound having as its carboxyl function (i.e., —CO–Y) a mixed anhydride residue formed with an organic or inorganic acid. Suitably, a carboxyl compound of Formula II above (Y=OH) is treated in an inert solvent (such as tetrahydrofuran) with a base, for example, triethylamine, the resulting salt reacted with a chlorocarbonic acid ester at a low temperature, and the resulting mixed anhydride reacted without isolation with a compound of Formula III above, e.g., with an amino acid ester ($X^1$=alkoxy), or with a sodium salt of an amino acid ($X^1$=ONa). Exemplary of chlorocarbonic acid esters which can be employed are lower alkyl esters such as methyl, ethyl or t-butyl. The active anhydride can also be prepared using sulfur trioxide in dimethylformamide, diethylphosphorochloriditone [$(C_2H_5O)_2P$–Cl], tetraethylpyrophosphite [$(C_2H_5O)_2P$–O–$P(OC_2H_5)_2$], or the like.

Method utilizing active ester: This method comprehends using as a starting material of Formula II above a compound in which the carboxyl function (i.e., —COY) is a so-called active ester group such as, for example, COY=p-nitrophenyl ester. Such an active ester can be obtained from a protected amino acid and di(p-nitrophenyl)-sulfite $NO_2$—$C_6H_4$—SO—$C_6H_4$—$NO_2$) in the presence of pyridine. On reaction at room temperature with an amino acid ester of Formula III ($X'$=alkoxy) the active ester gives the desired peptide compound which can then be worked up by crystallization. Exemplary of suitable active ester groups are the p-nitrophenyl, 3,5-dinitrophenyl, thiophenyl, and the like ester groups.

Intermediate compounds of the formula:

wherein $R_1$ has the same meaning as above; Y is selected from the group consisting of halogen, alkoxy (preferably lower alkoxy), hydrazino, hydroxy, azido, phenoxy, nitrophenoxy, phenylmercapto and the residue of an anhydride with an inorganic or oragnic acid, and at least one of the two amino groups is substituted by a long-chain alkoxycarbonyl or long-chain alkenoxycarbonyl group are novel compounds and form a part of this invention. The second amino group can either be unsubstituted, bear a second long-chain alkoxycarbonyl or alkenoxycarbonyl group or be protected with a removable protecting group. Exemplary of such compounds are $N^α$-octyloxycarbonyl-($N^γ$ - carbobenzoxy) - L - ornithyl - $OCH_3$, $N^α$ - octyloxycarbonyl - ($N^γ$ - carbobenzoxy) - L - ornithyl - $NHNH_2$, $N^α$ - cetyloxycarbonyl - ($N^ε$ - carbobenzoxy - L - lysyl-OH and $N^α$ - lauryloxycarbonyl - ($N^γ$ - carbobenzoxy)-D-α,γ-diaminobutyryl-OH.

When, in formulae above X has the meaning alkylamino or dialkylamino, the so comprehended alkyl moiety can either be long-chain (i.e., contain from 8 to 20 carbon atoms) or can be lower alkyl. Both branched and straight chain alkyl moieties are comprehended.

The compounds of Formula I above and their non-toxic acid addition salts are useful as preserving and disinfecting agents. They are active against gram positive and gram negative pathogenic and apathogenic bacteria, such as pneumococci, streptococci, anthrax bacilli, staphylococci, enterococci; *Escherichia coli*, *Salm. enterit.* G., Salm. typhi murium, Shigella, Pseudom. pyocan., Klebs. pneum. DHD, Prot. vulgaris, as well as against fungi and yeasts, such as aspergilli and penicillia, Saccharomyces cerevisiae and Rhodotorula rubra.

The compounds decompose under the influence of proteolytic enzymes to give essential amino acids or very closely related compounds which no longer have any antibacterial activity. The compounds of Formula I thus do not give rise to any residue problem and are of low toxicity. Thus, compounds of Formula I are especially useful for preserving materials intended for oral ingestion, e.g., foods. Thus, another embodiment of this invention comprehends a food composition which comprises an edible material treated with an amount sufficient to effectively preserve said edible material of a peptide compound selected from the group consisting of compounds of the Formula I and non-toxic acid addition salts thereof. The compounds of Formula I and their non-toxic acid addition salts can be added to foods in an amount sufficient to preserve same in any conventional manner. Thus, they can be intimately intermixed with solid foodstuffs or can be dissolved or suspended in liquid foodstuffs. They can be used as disinfecting agents via the simple method of contacting the area or substance to be disinfected with an amount of peptide sufficient to achieve the desired disinfection.

In a separate aspect, the compounds of Formula I above and their non-toxic acid addition salts are useful as coccidiostats. Thus, they can be intermixed with animal feeds or feedstuffs intended for ingestion by animals (e.g., fowl, such as chickens) subject to coccidiosis. Especially useful as a coccidiostat is the compound $N^\alpha$-lauryloxycarbonyl - D - $\alpha,\gamma$ - diaminobutyryl - D - $\alpha,\gamma$ - diaminobutyric acid methyl ester and its non-toxic acid addition salts.

As stated above the compounds of Formula I form non-toxic acid addition salts. Thus, they form non-toxic acid addition salts with both inorganic and oragnic acids such as, for example, hydrochloric acid, nitric acid, phosphoric acid, toluenesulfonic acid, citric acid and the like.

The following examples are illustrative but not limitative of the invention. All temperatures are stated in ° C. In the examples the following abbreviations are used:

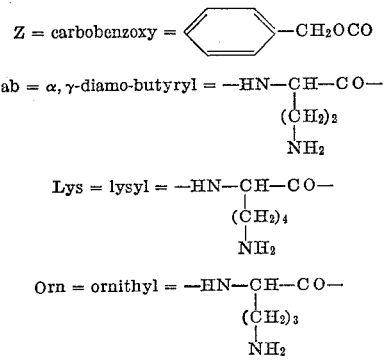

As illustrative of the above usage in the following examples there can be cited for example $N^\alpha$-cetyloxycarbonyl - ($N^\epsilon$ - carbobenzoxy) - L - lysyl - ($N^\epsilon$ - carbobenzoxy)-L-lysyl-OCH$_3$ which in the following examples is shown as $N^\alpha$ - cetyloxycarbonyl - ($N^\epsilon$ - Z) - L - Lys-($N^\epsilon$-Z)-L-Lys-OCH$_3$.

EXAMPLE 1

$N^\alpha$-cetyloxycarbonyl-($N^\epsilon$-Z)-L-Lys-($N^\epsilon$-Z)-L-Lys-OCH$_3$ 18.3 g. of $N^\alpha$-cetyloxycarbonyl-($N^\epsilon$-Z)-L-Lys-OH is dissolved in 150 ml. of absolute tetrahydrofuran and treated at −10° with 5.4 g. of carbonyl-diimidazole. The mixture is then stirred at 0° for a further 20 minutes. Then, 9.8 g. of H-($N^\epsilon$-Z)-L-Lys-OCH$_3$ in 50 ml. of absolute tetrahydrofuran is added and the mixture is again stirred at room temperature for a further 4 hours. The reaction is then evaporated in a vacuum and taken up in ethyl acetate. The resulting mixture is then washed three times with 1 N hydrochloric acid, twice with water and once with saturated sodium chloride solution, dried over sodium sulfate and evaporated in a vacuum. The residue yields, upon recrystallization from (ethyl acetate)/(petroleum ether), $N^\alpha$-cetyloxycarbonyl-($N^\epsilon$-Z)-L-Lys-($N^\epsilon$-Z)-L-Lys-OCH$_3$, melting at 93–101°. Further recrystallization from the above solvent raises the melting point to 105–106°. $[\alpha]_D^{21}$: −10.1° ($c$=1.0 methanol).

$N^\alpha$-cetyloxycarbonyl-L-Lys-L-Lys-OCH$_3$.2HCl 15.1 g. of $N^\alpha$-cetyloxycarbonyl-($N^\epsilon$-Z)-L-Lys-($N^\epsilon$-Z)-L-Lys-OCH$_3$ is hydrogenolyzed in 200 ml. of glacial acetic acid in the presence of 3.5 g. of 5 percent palladium/carbon. After the uptake of 930 ml. of hydrogen, the hydrogenation stops and the mixture is filtered. After evaporation in a vacuum, there remains a water-soluble residue which is dissolved in 22 ml. of 2.3 N methanolic hydrochloric acid and subsequently evaporated to dryness. The solid residue yields, after twice being crystallized from (ethyl acetate)/(petroleum ether), $N^\alpha$-cetyloxycarbonyl-L-Lys-L-Lys-OCH$_3$.2HCl melting at 190–192°; $[\alpha]_D^{24}$: −13.3° ($c$=0.99 in methanol).

The preparation of the $N^\alpha$-cetyloxycarbonyl-($N^\epsilon$-Z)-L-Lys-OH required as the starting material is as follows: 121 g. of cetyl alcohol is dissolved in 1000 ml. of benzene. While stirring, benzene is distilled off until water no longer passes over therewith. Thereafter, the temperature is permitted to fall to 55–60° and 70 ml. (99 g.=1 mol.) of condensed phosgene is allowed to distill in—which takes about 6 hours. Then, half of the benzene is distilled off, while a gentle stream of nitrogen is blown over the solution. The residue, which is free from phosgene and hydrochloric acid, is further completely freed from benzene in a vacuum, whereby about 150 g. of cetyloxycarbonyl chloride is obtained.

28.0 g. of finely powdered ($N^\epsilon$-Z)-L-Lys-OH is added to 120 ml. of 1 N caustic soda and 50 ml. of acetone. Then, at about 5° with simultaneous stirring, treated dropwise with 30.5 g. of cetyloxycarbonyl chloride and 100 ml. of 1 N caustic soda—which takes about 35 minutes. The mixture is then stirred for a further 20 minutes, then treated with 3 N hydrochloric acid until acidic as indicated by Congo red and extracted twice with ethyl acetate. The extract is then washed twice with 1 N hydrochloric acid, twice with water and once with saturated sodium chloride solution, dried over sodium sulfate and evaporated in a vacuum. The residue is crystallized from hexane and recrystallized from ether/(petroleum ether) and yields $N^\alpha$-cetyloxycarbonyl-($N^\epsilon$Z)-L-Lys-OH melting at 56–69°. $[\alpha]_D^{21}$: +11.6° ($c$=0.96 in chloroform).

EXAMPLE 2

$N^\alpha$-octyloxycarbonyl-($N^\delta$-Z)-L-Orn-NH-NH$_2$ 31.7 g. of ($N^\delta$-Z)-L-Orn-OCH$_3$.HCl is finely powdered, suspended in 300 ml. of benzene and freed of water by azeotropic distillation. Then, under reflux and with stirring, phosgene is introduced until complete solution is obtained (about 5 hours). Subsequently, ⅔ of the benzene is distilled off in a stream of nitrogen, and the remainder of the benzene is removed in a vacuum. There is obtained carbonyl-($N^\delta$-Z)-L-Orn-OCH$_3$ in oily form.

From 400 ml. of benzene, 100 ml. are distilled off and to the residue are added 15.1 ml. of n-octanol. Then, while stirring at 2°, 26.4 g. of carbonyl-($N^\delta$-Z)-L-Orn-OCH$_3$ in 50 ml. of absolute benzene is added thereto and the mixture is left to stand at room temperature for 16 hours. After evaporation in a vacuum, there remain $N^\alpha$-octyloxycarbonyl-($N^\delta$-Z)-L-Orn-OCH$_3$ as a colorless oil which does not crystallize.

The oil is dissolved in 200 ml. of methanol and treated with 8.5 ml. of hydrazine hydrate. After standing at room temperature for 20 hours, it is evaporated in a vacuum, recrystallized from alcohol/water and dried for 3 days over sulfuric acid in a vacuum. There is obtained $N^\alpha$-octyloxycarbonyl-$(N^\delta$-Z)-L-Orn-NH-NH$_2$ melting at 110–120°. $[\alpha]_D^{25}$: $-7.23°$ ($c=1.03$ in methanol).

$N^\alpha$-octyloxycarbonyl-$(N^\delta$-Z)-L-Orn-$(N^\delta$-Z)-L-Orn-OCH$_3$ 31.6 g. of $N^\alpha$-octyloxycarbonyl-$(N^\delta$-Z)-L-Orn-NH-NH$_2$ is stirred in 200 ml. of 2 N hydrochloric acid and 200 ml. of ethyl acetate and brought into solution with 15 ml. of glacial acetic acid. Then, at 5° while stirring, sufficient 50 percent sodium nitrite solution is added dropwise until a (potassium iodide)/starch paper is no longer decolorized (about 10 ml.). The aqueous phase is then separated, the organic phase extracted with ice-water and twice with 10 percent potassium hydrogen carbonate solution and ice, and insoluble material filtered off. The filtrate is dried over sodium sulfate and added to a solution of 20.5 g. of H-$(N^\delta$Z)-L-Orn-OCH$_3$. The mixture is then left to stand at room temperature for 18 hours, then washed twice with 3 N hydrochloric acid, twice with water and once with saturated sodium chloride solution, dried and concentrated in a vacuum. The solid residue is recrystallized from benzene/(petroleum ether), yielding $N^\alpha$-octyloxycarbonyl-$(N^\delta$-Z)-L-Orn-$(N^\delta$-Z)-L-Orn-OCH$_3$ melting at 83–93°. $[\alpha]_D^{26}$: $-6.55°$ ($c=0.99$ in methanol).

$N^\alpha$-octyloxycarbonyl-L-Orn-L-Orn-OCH$_3$.2HCl 27.9 g. of $N^\alpha$-octyloxycarbonyl-$(N^\epsilon$-Z)-L-Orn-$(N^\epsilon$Z)-L-Orn-OCH$_3$ is hydrogenolyzed in 200 ml. of glacial acetic acid with 5 g. of 10 percent palladium/carbon (soda lime method). After the uptake of 2.1 liters of hydrogen, the hydrogenation stops. Solids are filtered off under suction, and the filtrate evaporated in a vacuum. The residue is dissolved in 100 ml. of 2 N methanolic hydrochloric acid and once more evaporated in a vacuum. It is recrystallized from methanol/ether, yielding $N^\alpha$-octyloxycarbonyl-L-Orn-L-Orn-OCH$_3$.2HCl melting at 206–211° (dec.) $[\alpha]_D^{26}$: $-16.8°$ ($c=0.99$ in methanol).

EXAMPLE 3

$N^\alpha$-lauryloxycarbonyl-$(N^\gamma$-Z)-D-Dab-OH 28.7 g. of lauryl alcohol is dissolved in 250 ml. of benzene and freed from water by azeotropic distillation. Then, at 60° while stirring, 21.2 ml. of liquefied phosgene are allowed to distill in and subsequently the mixture is stirred for a further 4 hours at the same temperature. Then, half of the benzene is distilled off in a stream of nitrogen in order to remove excess phosgene and hydrochloric acid, and subsequently the mixture is evaporated in a vacuum until the weight is constant. There is thus obtained lauryloxycarbonyl chloride as an oily residue which is not further purified.

36.6 g. of H-$(N^\gamma$-Z)-D-Dab-OH dissolved in 160 ml. of caustic soda and 50 ml. of acetone, is simultaneously treated dropwise (about 35 minutes) with 36.2 g. of lauryloxycarbonyl chloride and 145 ml. of 1 N caustic soda while stirring at about 5°. The mixture is then stirred for still a further 30 minutes, then acidified with 3 N hydrochloric acid and extracted twice with ethyl acetate. The ethyl acetate extract is washed twice with 1 N hydrochloric acid, twice with water, dried over sodium sulfate and evaporated in a vacuum. The evaporation residue crystallizes upon trituration with a little water, and is recrystallized from hexane, yielding $N^\alpha$-lauryloxycarbonyl-$(N^\gamma$-Z)-D-Dab-OH melting at 69–72°, $[\alpha]_D^{24}$: $+7.88°$ ($c=1.00$ in methanol).

$N^\alpha$-lauryloxycarbonyl-$(N^\gamma$-Z)-D-Dab-$(N^\gamma$-Z)-D-Dab-OCH$_3$ 23 g. of H-$(N^\gamma$-Z)-D-Dab-OCH$_3$.HCl are finely powdered, suspended in 50 ml. of chloroform and treated with 11.2 ml. of triethylamine, vigorously shaken, treated with 200 ml. of ether and, after standing for 20 minutes in an ice-bath, filtered under suction to remove triethylammonium chloride.

35 g. of $N^\alpha$-lauryloxycarbonyl-$(N^\gamma$-Z)-D-Dab-OH are dissolved in 150 ml. of absolute tetrahydrofuran, cooled to 5–10° and, while stirring, 13 g. of 95 percent carbonyldiimidazole are added thereto. After stirring for 30 minutes, the solution obtained according to the previous paragraph is added thereto and the mixture is left to stand for 4 hours at room temperature. After evaporation in a vacuum, the residue is taken up in ethyl acetate, washed three times with 1 N hydrochloric acid and once with water (with the addition of some methanol for improved phase separation). Then, it is dried over sodium sulfate and evaporated in a vacuum. Upon recrystallization from chloroform/(petroleum ether), there is obtained $N^\alpha$-lauryloxycarbonyl-$(N^\gamma$-Z)-D-Dab-$(N^\gamma$-Z)-D-Dab-OCH$_3$ melting at 107–109°, $[\alpha]_D^{24}$: $+18.7°$ ($c=0.99$ in methanol).

$N^\alpha$-lauryloxycarbonyl-D-Dab-OCH$_3$.2HCl 17.5 g. of $N^\alpha$-lauryloxycarbonyl-$(N^\gamma$-Z)-D-Dab-$(N^\gamma$-Z)-D-Dab-OCH$_3$ is brought into solution in 200 ml. of glacial acetic acid by slight heating and then hydrogenolyzed in the presence of 5 g. of 5 percent palladium/carbon until the hydrogenation stops after the uptake of 1.2 liters of hydrogen. It is then filtered free of catalyst and evaporated in a vacuum. 60 ml. of 2 N methanolic hydrochloric acid are added to the oily residue and it is evaporated again. $N^\alpha$-lauryloxycarbonyl-D-Dab-D-Dab-OCH$_3$.2HCl melting at 188–194°, is then obtained upon crystallization from methanol/ether. $[\alpha]_D^{25}$: $+17.4°$ ($c=1.00$ in methanol).

EXAMPLE 4

$N^\alpha$-myristyloxycarbonyl-L-Lys-L-Lys-OCH$_3$.2HCl (a) $N^\alpha$-form-$(N^\epsilon$-Z)-L-Lys-$(N^\epsilon$-Z)-L-Lys-OCH$_3$.—26.3 g. of $N^\alpha$-form-$(N^\epsilon$-Z)-L-Lys-OH [J. Amer. Chem. Soc. 1960, 82, 3727] is dissolved in 150 ml. of absolute tetrahydrofuran and treated, at $-10°$ while stirring, with 13.8 g. of carbonyldiimidazole. After 30 minutes, a solution of H-$(N^\epsilon$-Z)-L-Lys-OCH$_3$ (liberated from 28 g. of the hydrochloride with triethylamine) in 50 ml. of tetrahydrofuran is added thereto and the mixture is stirred for a further 4 hours at room temperature. It is then evaporated in a vacuum, the residue taken up in ethyl acetate and washed with ice-cold 1-molar tartaric acid solution, ice-water, 10 percent potassium hydrogen carbonate solution and saturated sodium chloride solution—during this washing procedure some tetrahydrofuran must occasionally be added in order to obtain solution of precipitated substances. Then, it is dried over sodium sulfate and evaporated in vacuum. The $N^\alpha$-form-$(N^\epsilon$-Z)-L-Lys-$N^\epsilon$-Z)-L-Lys-OCH$_3$ thus obtained melts at 147–149° upon being crystallized from acetone/ether; $[\alpha]_D^{22}=16.9°$ ($c=1.0$ in methanol.

(b) Deformylation of $N^\alpha$-form-$(N^\epsilon$-Z)-L-Lys-$(N^\epsilon$-Z)-L-Lys-OCH$_3$.—40 g. of $N^\alpha$-Form-$(N^\epsilon$-Z)-L-Lys-$(N^\epsilon$-Z)-L-Lys-OCH$_3$ is dissolved in 150 ml. of methanol and the solution cooled down to room temperature, treated with about 300 ml. of (hydrochloric acid gas)/methanol (4 N) and left to stand for 6 hours. Then, it is concentrated at 40° and dissolved about 4 times in methanol and each time again evaporated. There is obtained an oily crude product which is directly processed.

(c) $N^\alpha$-myristyloxycarbonyl-$(N^\epsilon$-Z)-L-Lys-$(N^\epsilon$-Z)-L-Lys-OCH$_3$.—40.5 g. of the crude product obtained above is dissolved in about 200 ml. of tetrahydrofuran and treated with 22 ml. of triethylamine, in order to obtain the free base. After being cooled for a short time, it is filtered off under suction from precipitated triethylamine hydrochloride. The filtrate is once more treated with 22 ml. of triethylamine and cooled to $-10°$. While stirring, 18.7 g. of myristyloxycarbonyl chloride dissolved in 20 ml. of tetrahydrofuran, are added thereto. After further stirring at about 0°, the reaction mixture is evaporated under reduced pressure, the residue taken up in ethyl acetate and washed well with 0.1 N hydrochloric acid. The ethyl acetate solution is then dried and evaporated, whereby $N^\alpha$-myristyloxycarbonyl-(N-Z)-L-Lys-($N^\epsilon$-Z)-L-Lys-$OCH_3$ precipitates. After recrystallization from ethyl acetate, it melts at 110–113°.

(d) *Hydrogenation.*—16 g. of the $N^\alpha$-myristyloxycarbonyl-($N^\epsilon$-Z)-L-Lys-($N^\epsilon$-Z)-L-Lys-$OCH_3$ thus obtained is dissolved in 200 ml. of glacial acetic acid and hydrogenated with about 2 g. of palladium/carbon. During the hydrogenation the catalyst is replaced once in order to achieve a complete hydrogenation. After the hydrogenation is completed, the ethyl acetate is removed under reduced pressure and, for the conversion of the acetate into hydrochloride, the residue is treated with (hydrochloric acid)/methanol, concentrated, evaporated three times with methanol and recrystallized from methanol/ether. There is thus obtained $N^\alpha$-myristyloxycarbonyl-L-Lys-L-Lys-$OCH_3$·2HCl melting at 171–173°. $[\alpha]_D^{21}$: $-16°$ ($c=1$ in water).

We claim:
1. A compound selected from the group consisting of compounds of the formula

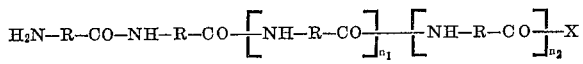

and non-toxic acid addition salts thereof wherein $n_1$ and $n_2$ are each a whole integer from 0 to 1; X is selected from the group consisting of hydroxy, lower alkoxy, amino, lower alkylamino, di-lower alkylamino and hydrazino; each R is the residue of a diamino-carboxylic acid of 3 to 6 carbon atoms devoid of its α-amino and carboxyl groups; and the molecule contains one long-chain aliphatic group selected from the group consisting of alkoxycarbonyl and alkenoxycarbonyl of 9 to 21 carbon atoms on an amino group not partaking in a peptide linkage.

2. A compound of the formula

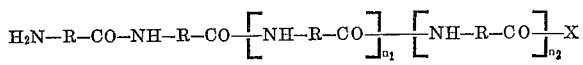

and non-toxic acid addition salts thereof wherein $n_1$ and $n_2$ are each a whole integer from 0 to 1; X is selected from the group consisting of hydroxy, lower alkoxy, amino, lower alkylamino, di-lower alkylamino and hydrazino; each R is the residue of a diamino-carboxylic acid of 3 to 6 carbon atoms devoid of its α-amino and carboxyl groups; and the molecule contains one long-chain aliphatic group selected from the group consisting of alkoxycarbonyl and alkenoxycarbonyl of 9 to 21 carbon atoms on an amino group not partaking in a peptide linkage, and at least one removable protecting group selected from the group consisting of benzyloxycarbonyl, phthalyl and formyl, on an amino group not partaking in a peptide linkage.

3. A compound selected from the group consisting of compounds of the formula

and non-toxic acid addition salts thereof wherein X is selected from the group consisting of hydroxy, lower alkoxy, amino, lower alkylamino, di-lower alkylamino and hydrazino; each R is the residue of a diamino-carboxylic acid of 3 to 6 carbon atoms devoid of its α-amino and carbonyl group, and $R_1$ is selected from the group consisting of long-chain alkyl and long-chain alkenyl of 8 to 20 carbon atoms.

4. A compound selected from the group consisting of compounds of the formula

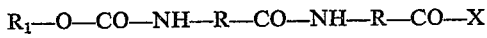

and non-toxic acid addition salts thereof wherein X is selected from the group consisting of hydroxy, lower alkoxy, amino, lower alkylamino, di-lower alkylamino and hydrazino; each R is the residue of a diamino-carboxylic acid of 3 to 6 carbon atoms devoid of its α-amino and carboxyl group; $R_1$ is selected from the group consisting of long-chain alkyl and long-chain alkenyl of 8 to 20 carbon atoms;

and the molecule contains at least one removable protecting group selected from the group consisting of benzyloxycarbonyl, phthalyl and formyl, on an amino not partaking in the peptide linkage.

5. Compounds of claim 1 above wherein each R is the residue of an L-α-amino acid.

6. Compounds of claim 1 above wherein each R is the residue of lysine.

7. A compound selected from the group consisting of $N^\alpha$-cetyloxycarbonyl-L-lysyl-L-lysine and its lower alkyl esters, amide, hydrazide, alkylamides, and dialkylamides, each alkyl group containing 1 to 20 carbon atoms.

8. A compound selected from the group consisting of $N^\alpha$-octyloxycarbonyl-L-ornithyl-L-ornithine and its lower alkyl esters, amide, hydrazide, alkylamides, and dialkylamides, each alkyl group containing 1 to 20 carbon atoms.

9. A compound selected from the group consisting of $N^\alpha$-lauryloxycarbonyl-D-diaminobutyryl-D-diaminobutyric acid and its lower alkyl esters, amide, hydrazide, alkylamides, and dialkylamides, each alkyl group containing 1 to 20 carbon atoms.

10. A compound selected from the group consisting of $N^\alpha$-myristyloxycarbonyl-L-lysyl-L-lysine and its lower alkyl esters, amide, hydrazide, alkylamides, and dialkylamides, each alkyl group containing 1 to 20 carbon atoms.

11. A compound of the formula

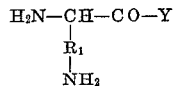

wherein Y is selected from the group consisting of halogen, lower alkoxy, hydrazino, azido, phenoxy, nitrophenoxy, phenylmercapto, hydroxy and the residue of an anhydride with a lower alkyl ester of chlorocarbonic acid, diethylphosphorochloridite or tetraethylpyrophosphite; $R_1$ is selected from the group consisting of lower alkylene and

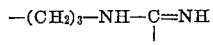

one of the two amino groups is substituted by a long-chain aliphatic group selected from the group consisting of long-chain alkoxycarbonyl and long-chain alkenoxycarbonyl of 9 to 21 carbon atoms, and the other is substituted by up to one removable protecting group selected from the group consisting of benzyloxycarbonyl, phthalyl and formyl.

References Cited
UNITED STATES PATENTS

| | | | |
|---|---|---|---|
| 2,041,265 | 5/1936 | Orthner et al. | 260—9 |
| 2,290,174 | 7/1942 | Epstein et al. | 167—22 |
| 3,040,021 | 10/1961 | Selle et al. | 260—123.7 |
| 3,024,272 | 3/1962 | Hyson et al. | 260—501 |
| 3,265,682 | 8/1966 | Gloor et al. | 260—112.5 |
| 2,879,164 | 3/1959 | White et al. | 99—14 |
| 3,078,301 | 2/1963 | Taub | 260—482 |

LEWIS GOTTS, *Primary Examiner.*

E. L. ROBERTS, *Examiner.*

M. M. KASSENOFF, *Assistant Examiner.*

UNITED STATES PATENT OFFICE
CERTIFICATE OF CORRECTION

Patent No. 3,362,947                        January 9, 1968

Peter Quitt et al.

It is hereby certified that error appears in the above numbered patent requiring correction and that the said Letters Patent should read as corrected below.

Column 2, line 51, after the formula insert -- (IV) --. Column 3, line 70, "Y=$N_S$)" should read -- (Y=$N_3$) --. Column 4, line 34, "sulfite $NO_2$-" should read -- sulfite ($NO_2$- --; line 52, "oragnic" should read -- organic --. Column 5, line 1, "pyocan.," should read -- pyocyan., --; line 38, "oragnic" should read -- organic --. Column 6, line 52, "56-69°" should read -- 59-69° --. Column 7, line 20, "H- ($N^\delta Z$)-" should read -- H-($N^\delta$-Z)- --; line 74, "'50ml." should read -- 50 ml. --. Column 8, line 20 "$N^\alpha$-lauryloxycarbonyl-D-Dab-$OCH_3$. 2HCl" should read -- $N^\alpha$-lauryloxycarbonyl-D-Dab-D-Dab-$OCH_3$. 2HCl --; line 53, "-($N^\epsilon$-Z)-L-Lys-$N^\epsilon$-Z)-" should read -- -($N^\epsilon$-Z)-L-Lys-($N^\epsilon$-Z)- --; line 55, "=16.9°" should read -- =-16.9° --. Column 9, line 5, "(N-Z)-" should read -- ($N^\epsilon$-Z)- --; line 67, "carbonyl" should read -- carboxyl --. Column 10, line 63, "3,040,021" should read -- 3,004,021 --.

Signed and sealed this 9th day of September 1969.

(SEAL)
Attest:

EDWARD M. FLETCHER, JR.            WILLIAM E. SCHUYLER, JR.
Attesting Officer                 Commissioner of Patents